March 12, 1957  W. G. POCHOPIEN  2,784,505

SNOWPLOW ATTACHMENT FOR MOWER

Filed June 30, 1954

INVENTOR.
Wojciech George Pochopien
BY Alex. E. MacRae
Attorney.

United States Patent Office 2,784,505
Patented Mar. 12, 1957

2,784,505

SNOWPLOW ATTACHMENT FOR MOWER

Wojciech George Pochopien, Welland, Ontario, Canada

Application June 30, 1954, Serial No. 440,411

2 Claims. (Cl. 37—53)

This invention relates to a snow plow attachment for lawn mowers.

It is an object of this invention to provide a simple snow plow attachment which may be quickly and easily mounted on any conventional reel type lawn mower, which utilizes standard parts of such mower as the connecting means for the attachment on the mower and thus requires no separate fastening means, and which employs the mower in a most convenient and effective manner as the supporting medium therefor.

Figure 1:
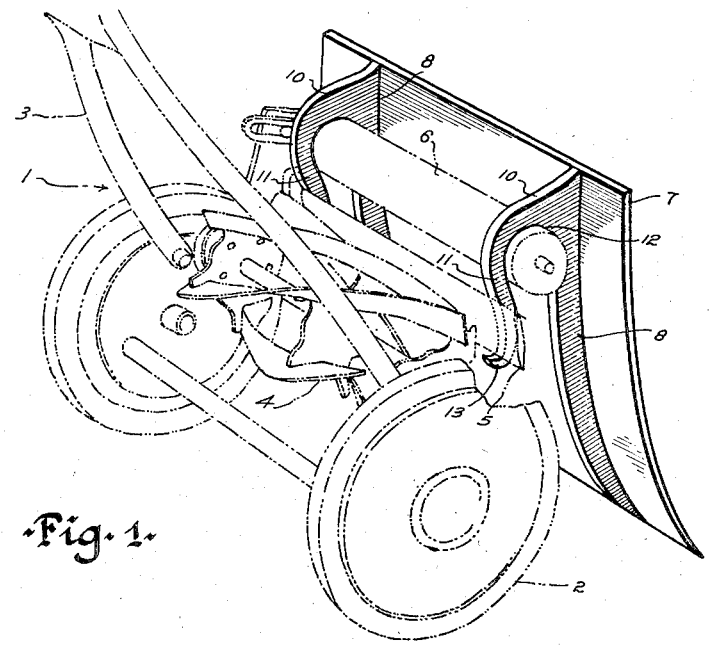
Figure 2:
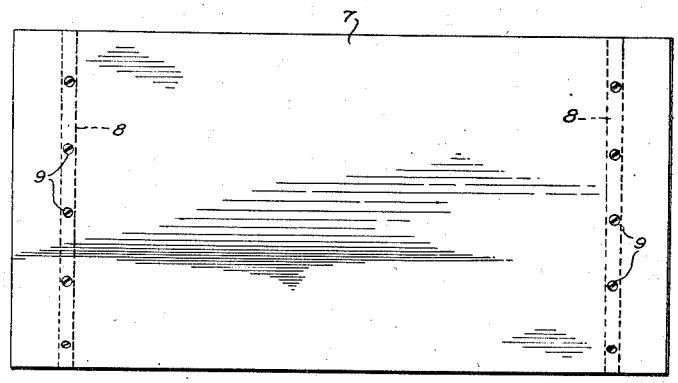

The invention will be described with reference to the accompanying drawing, in which Figure 1 is a perspective view of the attachment as mounted on a lawn mower, and Figure 2 is a plan view of the attachment.

In the drawing, 1 is a conventional lawn mower having wheels 2, handle 3, reel 4, cutting bar 5 and roller 6.

The attachment of the present invention is arranged to be applied to the mower 1 when in reversed or non-cutting position, as shown, and comprises a plow blade 7, which may be flat or transversely curved as shown, and a pair of plates or hook members 8 fixed as by screws 9 to the rear face of the blade. Each member 8 is positioned adjacent a respective end edge of the blade and extends transversely thereof.

Each member 8 may be of flat metal formation and preferably extends from the top to the bottom edge of the blade to provide adequate support therefor. As shown, one edge of member 8 engages the rear face of the blade and may be curved to fit the contour thereof. Member 8 has a double or S-hook formation comprising a rearwardly directed extension 10 adjacent its upper end, an end portion 11 of such extension extending downwardly to provide a recess 12 and form one hooked end. The wall 12 of such recess is of semi-circular formation to closely engage a complementary portion of roller 6. The end portion 11 projects below the roller-engaging part thereof and terminates in a rearwardly extending hooked end 13 for hooking engagement with the lower edge of cutter bar 5 (when the mower is in reversed position), the rear edge of portion 11 engaging the forward face of the cutter bar. The hooked ends 12 and 13 are reversely directed, as shown.

It will be apparent that the dimensions of the blade 7, its curvature, and its angular relation to the mower is such that it will effectively engage the snow to be moved.

It will also be apparent that the attachment may be easily and quickly mounted upon and removed from the mower as desired. Thus, it requires only from 15 to 20 seconds to mount the attachment on the mower and about 10 seconds to remove it therefrom.

The recess 12 and hook 13 provide a most effective means for rigidly mounting the blade on the mower. This means utilizes the conventional roller and cutter bar to clamp the attachment to the mower without the use of separate fastening devices.

I claim:

1. A snow plow attachment for lawn mowers comprising a plow blade having front and rear faces and top and bottom edges, and means for mounting the blade on a lawn mower comprising a pair of flat plates fixed to the rear face of the blade and extending vertically thereof, each said plate having a double hook formation comprising a rearwardly directed extension having a downwardly extending portion, said extension being in integral and coplanar relation with the plate, said downwardly extending portion having a rearwardly and upwardly directed hooked end.

2. In a lawn mower having a cutter blade and a roller, a snow plow attachment therefor comprising a plow blade having front and rear faces and top and bottom edges, and means for mounting the blade on said mower comprising a pair of unitary and uniplanar plates fixed to the rear face of the blade and extending vertically thereof, each said plate having a roller-receiving recess, the mouth of said recess being downwardly disposed, and a cutter blade-engaging hook rearwardly disposed with respect to said recess.

References Cited in the file of this patent

UNITED STATES PATENTS

| | | |
|---|---|---|
| 404,690 | Deland | June 4, 1889 |
| 1,076,014 | Boss | Oct. 21, 1913 |
| 2,032,487 | Lloyd | Mar. 3, 1936 |
| 2,320,387 | Schroeder | June 1, 1943 |